Figure 1:
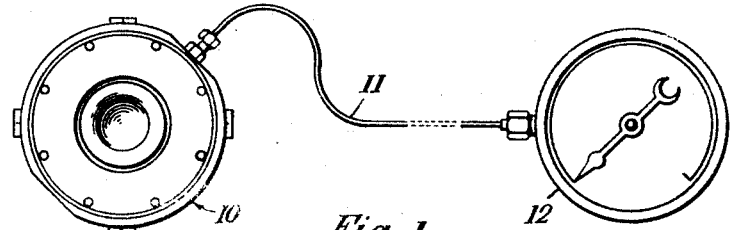

April 26, 1960  F. S. SAUNDERS  2,934,092
LOAD CELL FOR WEIGHING MACHINES
Filed May 29, 1956  2 Sheets-Sheet 1

INVENTOR
FRANK S. SAUNDERS
By Watson, Cole, Grindle & Watson
ATTORNEYS

April 26, 1960
F. S. SAUNDERS
2,934,092
LOAD CELL FOR WEIGHING MACHINES
Filed May 29, 1956
2 Sheets-Sheet 2
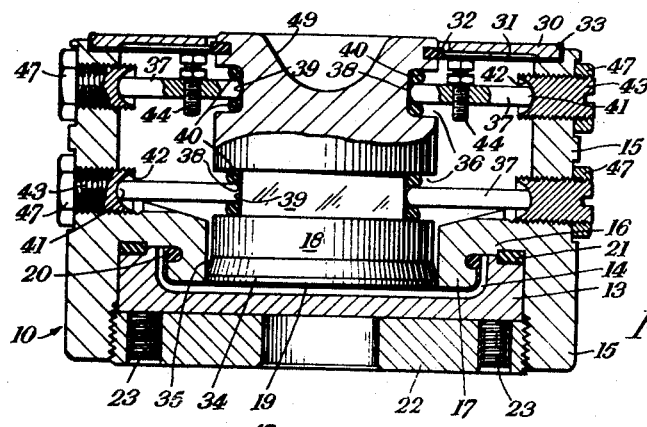
Fig. 2.
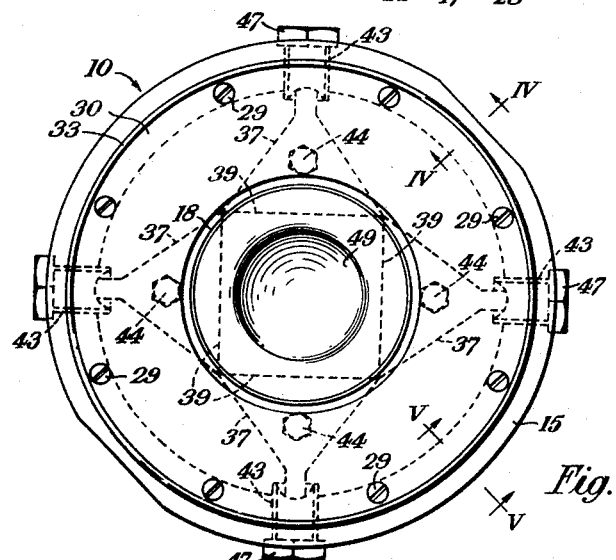
Fig. 3.
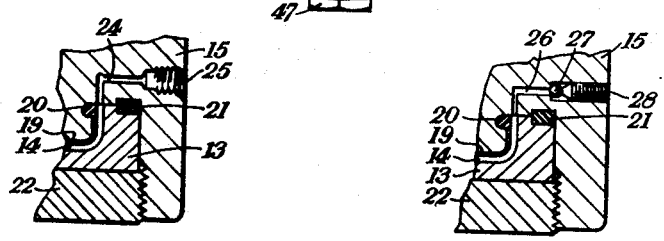
Fig. 4.
Fig. 5.
INVENTOR
FRANK S. SAUNDERS
By Watson, Cole, Grindle & Watson
ATTORNEYS

United States Patent Office 2,934,092
Patented Apr. 26, 1960

2,934,092

LOAD CELL FOR WEIGHING MACHINES

Frank Stanley Saunders, Kingswood, England, assignor to British Overseas Airways Corporation and Alltools Limited, both of Brentford, England Application May 29, 1956, Serial No. 588,183

10 Claims. (Cl. 137—778)

This invention relates to hydrostatic weighing machines of the type, described for example in United States Patents Nos. 2,392,702 and 2,529,194, comprising a receptacle having therein a cavity to contain an incompressible liquid, a plunger having a limited vertical sliding movement in relation to the receptacle, a flexible diaphragm abutting against the inner end of the plunger and constituting a top closure for the cavity and an external indicator for enabling the pressure on the liquid in the cavity to be read.

In use of the apparatus, the article to be weighed is placed on the plunger and the hydraulic pressure on the liquid in the cavity is read on a suitably calibrated dial of the indicator.

In the weighing machine described in United States Patent No. 2,392,702 the plunger is guided in its movement by a series of rows of balls, accommodated in longitudinal recesses in the plunger with their outer surfaces contacting a bore in a cover for the receptacle. The frictional forces engendered by the balls are, however, undesirable and in the weighing machine described in United States Patent No. 2,529,194 the plunger is guided in relation to the cover by a rubber ring located in position by annular nuts screwed respectively to the plunger and to the cover. This latter machine is capable of weighing to an accuracy of ±10 lbs. in 25 tons and the object of the present invention is to improve still further the accuracy of weighing by ensuring that the plunger will be prevented from touching the sides of the bore in the receptacle.

The invention accordingly provides a hydrostatic weighing machine of the above type in which the plunger is supported for movement in relation to the receptacle by a plurality of equally spaced supporting members extending transversely to the receptacle and making line contact at their inner ends with the plunger along lines in a common plane, said supporting members making line contact at their outer ends, also along lines in a common plane, with associated seatings on the receptacle.

Preferably two superposed sets of such supporting members are provided and the inner ends of each set of supporting members engage a recess in the plunger and are located in relation to the plunger by rings accommodated between the inner ends of the supporting members and the top and bottom walls of the recess. In use, the movement of the plunger in response to the heaviest load does not exceed 10 thousandths of an inch and the supporting members serve effectively to centralize the plunger in relation to the receptacle, rocking about their outer ends in response to inward movement of the plunger under the action of the weight.

Figure 6:
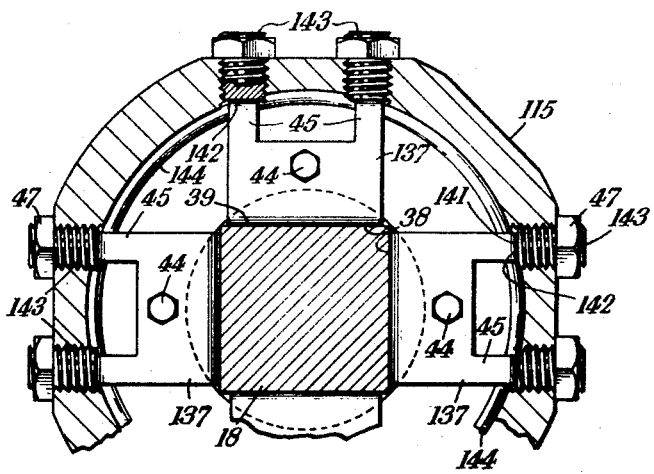
Figure 7:
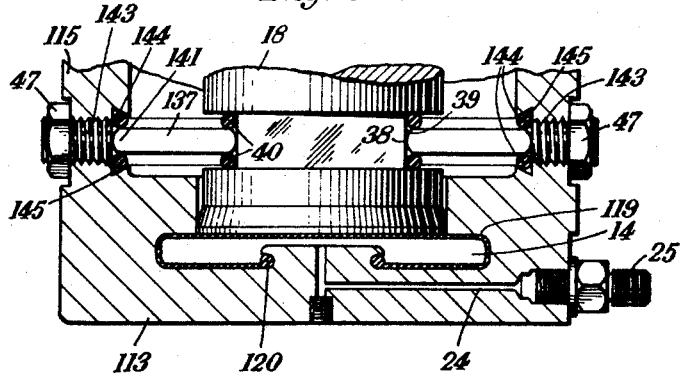

Two specific embodiments of the invention will now be described in more detail, by way of example, with reference to the accompanying drawings in which:

Fig. 1 shows in plan view a hydrostatic weighing machine and associated indicator, Fig. 2 is a vertical section through the weighing machine, Fig. 3 is a corresponding plan view, Figs. 4 and 5 are respectively sections on the lines IV—IV and V—V in Fig. 3, Fig. 6 is a part horizontal section through a modified form of weighing machine and Fig. 7 is a corresponding part vertical section.

Like reference numerals indicate like parts throughout the figures.

As shown in Fig. 1, the hydrostatic weighing machine 10 is connected by a capillary tube 11 to a pressure gauge 12 for indicating the hydrostatic pressure to which oil or other incompressible liquid contained in the weighing machine is subjected.

As shown in Figs. 2–5, the weighing unit 10 comprises a receptacle formed in two parts, viz. a dished cylindrical base 13 (Fig. 2) having therein a cavity 14 to contain the oil or other liquid and an upper portion of sleeve form having a cylindrical wall 15, which fits around the base and has an inwardly projecting flange 16 which rests on top of the base, the flange 16 having at its inner end a short cylindrical downward projection 17 within which is accommodated the lower end of the plunger 18. A rubber diaphragm 19, constituting a top closure for the receptacle, extends over the base of the plunger 18 and a peripheral bead 20 on the diaphragm is accommodated in an external circumferential retaining groove in said downward projection 17.

A packing ring 21 is disposed between the flange 16 and the top of the base 13 and the sleeve 15 is screwed to the base by a ring nut 22 screwed into the undersurface of the sleeve and bearing against the undersurface of the base. A number of grub screws 23 are screwed into the undersurface of the ring nut 22 and these hold the base 13 in sealing engagement with the packing ring 21.

The cavity 14 in the base communicates by a passage 24, with an outlet 25 for connection to the capillary tube 11 (Fig. 1). The cavity 14 also communicates with an air bleeding vent 26 (Fig. 5) containing a ball valve 27 and a bleed screw 28 by means of which the ball valve can be held against a seating in said vent.

Attached to the top of the sleeve 15 by screws 29 is a cover 30. An annular rubber diaphragm 31 is provided between the upper end of the plunger and the cover, the diaphragm having a bead 32 at its inner edge, engaging a circumferential recess in the plunger. A bead 33 at the outer edge of the diaphragm engages a recess in the outer face of the cover 30 as shown in Fig. 2.

The lower part 34 of the plunger is cylindrical and engages with a clearance of 2 thousandths of an inch in the bore of the downward extension 17 of the sleeve. The lower end of the plunger is chamfered at 35 so that it decreases slightly in diameter above the above-noted clearance.

The plunger is formed with two recesses 36 and is of square section within these recesses and upper and lower superposed sets of supporting members 37 extend between these square section parts of the plunger and the sleeve 15. As the two sets of supporting members 37 are identical, one only need be described.

The supporting members 37 are constituted by radially extending plates of approximately triangular form in plan. The inner end of each plate is rounded at 38 and makes line contact with the flat surface 39 of one of the recesses 36. The plate 37 is located in relation to the plunger by hard rubber rings 40 above and below it which fit closely between the plate and the top and bottom walls of the recess. Each plate 37 has a rounded outer end 41 engaging in a recess 42 of larger diameter in a radially extending screw 43 fitted into the sleeve 15.

To adjust the plunger 18 in its correct position, a circular shim is fitted into the above-described clearance between the plunger and the part 17, the radial screws 43 are screwed in against the outer ends of the triangular plates 37 and secured in adjusted position by lock nuts 47 and finally the shim is removed.

The upper plates 37 carry vertically disposed screws 44 which coact with the cover 30 to limit the movement of the plunger in the event of the weighing machine being turned upside down.

The plates 37 not only serve to centre the plunger, while leaving it free to move axially, but also serve to prevent rotation of the plunger in relation to the cover.

The embodiment shown in Figs. 6 and 7 differs from that already described in two respects.

Firstly, the supporting plates 137 are of rectangular shape in plane. Their rounded inner ends 38 as before contact with the flat surfaces 39 on the plunger 18. The plates 137 have, however, two projections 45 at their outer extremities. The projections have rounded ends 141 engaging flat surfaces 142 at the inner ends of the supporting screws 143. As indicated, the ends 141 of the projections are accommodated between rubber rings 144 disposed between the top and bottom surfaces of the projections 45 and the top and bottom walls of a groove 145 provided in the sleeve portion 115.

Secondly, the receptacle is formed in one piece, as indicated in Fig. 7, the sleeve portion 115 being integral with the base-portion 113. The peripheral portion of the diaphragm 119 rests against the base of the cavity 14 and its bead 120 engages a recess in the base portion 113 of the receptacle.

The weighing machine according to the invention will normally be used in the attitude illustrated. It can, however, be used with the plunger extending horizontally if it is required for it to act as a thrust or torque meter, e.g. to indicate the thrust exerted by the engines of an aircraft. In this case the thrust will be applied to the outer end of the plunger through the agency of a suitable thrust pad.

When an aircraft is to be weighed several weighing machines can be used for the purpose, a member projecting downwardly from the aircraft being received in a recess 49 in the top of the plunger 18 of each weighing machine.

What I claim as my invention and desire to secure by Letters Patent is:

1. A hydrostatic load cell comprising a receptacle having therein a cavity to contain an incompressible liquid and a bore extending towards said cavity, said cavity having a mouth facing said bore and an outlet whereby changes in fluid pressure within said cavity may be transmitted to the exterior of said load cell; a flexible diaphragm extending across the mouth of said cavity and separating said cavity from said bore, said diaphragm constituting the sole movable wall of said cavity; a plunger mounted for limited sliding movement in said bore in an axial direction, said plunger abutting at its inner end against said diaphragm, having its outer end positioned to receive a mechanical load to be measured and being displaceable in said bore on application to its outer end of said load to transmit said load to the liquid in the cavity; and at least three equally spaced supporting members within said bore and extending transversely to the axis of said bore for centralizing the plunger in said bore, said supporting members having inner ends and outer ends elongated transversely to the bore axis, said inner ends making line contact with said plunger in a common plane transverse to the axis of the plunger and said outer ends making line contact, also in a common plane transverse to the axis of the plunger, with seatings on said receptacle.

2. A load cell according to claim 1, wherein the inner ends of said supporting members are rounded in cross-section taken parallel to the bore axis and the plunger has flat surfaces which are engaged by said rounded inner ends.

3. A load cell according to claim 1, wherein said plunger has a peripheral recess in which the inner ends of said supporting members engage and comprising locating rings in said recess dispersed respectively on opposite sides of the inner ends of said supporting member.

4. A hydrostatic load cell comprising a receptacle having therein a cavity to contain an incompressible liquid and a bore extending towards said cavity, said cavity having a mouth facing said bore and an outlet whereby changes in fluid pressure within said cavity may be transmitted to the exterior of said load cell; a flexible diaphragm extending across the mouth of said cavity and separating said cavity from said bore, said diaphragm constituting the sole movable wall of said cavity; a plunger mounted for limited sliding movement in said bore in an axial direction, said plunger abutting at its inner end against said diaphragm, having its outer end positioned to receive a mechanical load to be measured and being displaceable in said bore on application to its outer end of said load to transmit said load to the liquid in the cavity; four equally spaced supporting members of triangular shape in said bore and extending transversely to the bore axis in a common plane and constraining the plunger against movements other than axial; and screws mounted in the wall of said bore, one adjacent the apex of each of said triangular supporting members, said supporting members making line contact with said plunger in a direction transverse to the axis thereof at their inner ends and making line contact in a direction transverse to the axis of the plunger with said screws at their outer ends.

5. A weighing machine according to claim 4, in which the inner ends of the supporting members are rounded in cross-section taken parallel to the plunger axis and engage flat surfaces on the plunger.

6. A weighing machine according to claim 4 in which the outer ends of the supporting members are rounded and engage curved recesses of larger diameter in said screws.

7. A hydrostatic load cell comprising a receptacle having therein a cavity to contain an imcompressible liquid and a bore extending towards said cavity, said cavity having a mouth facing said bore and an outlet whereby changes in fluid pressure within said cavity may be transmitted to the exterior of said load cell; a flexible diaphragm extending across the mouth of said cavity and separating said cavity from said bore, said diaphragm constituting the sole movable wall of said cavity; a plunger mounted for limited sliding movement in said bore in an axial direction, said plunger abutting at its inner end against said diaphragm, having an outer end positioned to receive a mechanical load to be measured and being displaceable in said bore on application to its outer end of said load to transmit said load to the liquid in the cavity; four equally spaced substantially rectangular supporting members in said bore and extending transversely to the bore axis in a common plane for centralizing the plunger in said bore; and screws mounted in the wall of said bore, two of said screws being associated with each of said supporting members, each of said supporting members having an inner end making line contact with said plunger in a direction transverse to the axis thereof and having at its outer end two projections making line contact with said screws in a direction transverse to the axis of the plunger.

8. A weighing machine according to claim 7, in which the inner ends of the supporting members are rounded in cross-section taken parallel to the plunger axis and engage flat surfaces on the plunger.

9. A weighing machine according to claim 7, in which the end of the projections on the supporting members are rounded and engage flat surfaces on the screws.

10. A load cell according to claim 1, wherein the portion of said bore adjacent said cavity in narrower than the portion thereof containing said supporting member and wherein the plunger fits closely within said narrower portion of the bore.

References Cited in the file of this patent

UNITED STATES PATENTS

| | | |
|---|---|---|
| 2,307,196 | Bohannan | Jan. 5, 1943 |
| 2,516,545 | Brewster | July 25, 1950 |
| 2,561,321 | Tate | July 17, 1951 |
| 2,765,811 | McClure | Oct. 9, 1956 |

FOREIGN PATENTS

| | | |
|---|---|---|
| 82,357 | Germany | Aug. 2, 1895 |
| 814,328 | France | June 21, 1937 |